(No Model.)
J. P. BUCKLEY.
MECHANISM FOR CONVERTING MOTION.
No. 522,249. Patented July 3, 1894.
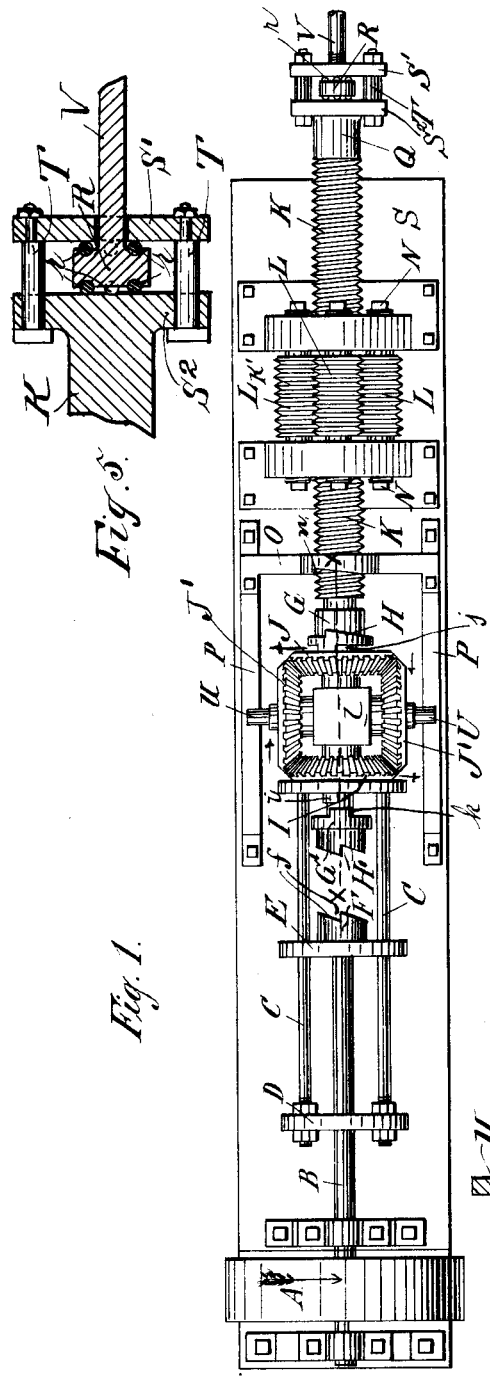
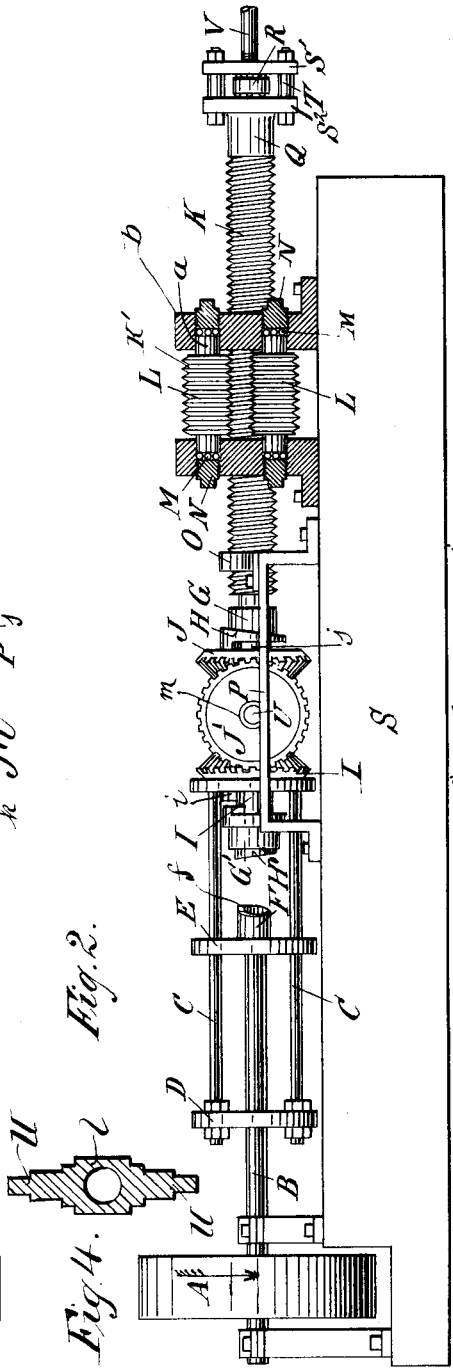
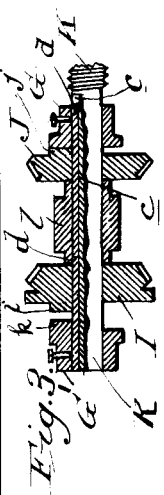
WITNESSES:
L. G. McCarthy
Ricardo Dee
INVENTOR
John P. Buckley
by W. P. Stringfellow
ATTORNEY

UNITED STATES PATENT OFFICE.

JOHN P. BUCKLEY, OF NEW ORLEANS, LOUISIANA, ASSIGNOR OF ONE-THIRD TO JOHN G. KOSTMAYER, OTTO HELLMAN, AND CHARLES SCHOENECK, OF SAME PLACE.

MECHANISM FOR CONVERTING MOTION.

SPECIFICATION forming part of Letters Patent No. 522,249, dated July 3, 1894.

Application filed November 9, 1892. Serial No. 451,414. (No model.)

*To all whom it may concern:*

Be it known that I, JOHN PATRICK BUCKLEY, a citizen of the United States, residing at New Orleans, in the parish of Orleans and State of Louisiana, have invented certain new and useful Improvements in Means for Converting Motion; and I do declare the following to be a full, clear, and exact description of the invention, such as will enable others skilled in the art to which it appertains to make and use the same.

This invention relates to improvements in mechanism for converting rotary into reciprocating motion, and it is designed more particularly for pressing cotton, although it may be employed to advantage in other connections as will be presently explained.

The invention will be fully understood from the following description and claims when taken in conjunction with the accompanying drawings, in which—

Figure 1, is a plan view of my improved apparatus. Fig. 2, is a side elevation of the same, and Fig. 3, is a detail vertical, longitudinal section taken in the plane indicated by the line x—x, of Fig. 1. Fig. 4 is a detached sectional view of the bearing block and its spindles. Fig. 5 is an enlarged longitudinal sectional view, partly broken away, of the connection or coupling between the screw shaft and the follower-rod.

Referring by letter to said drawings, S, indicates the base of my improved apparatus, and B, indicates a rotary shaft which is journaled in suitable bearings upon the base and carries a band wheel A, as shown. This shaft B, also carries a loose disk D, and a disk E, which latter is arranged in the opposite side of the disk D, with respect to the wheel A, and is keyed to the shaft for a purpose presently to be described.

K, indicates a rotary and longitudinal movable screw shaft, which is rotated from the shaft B, and is caused to move endwise in both directions as will be presently described. This screw shaft K, is journaled in a bearing K', which comprises three (more or less) rollers L, provided with annular grooves engaging the thread of the shaft K. These rollers L, are engaged at intervals around the shaft K, and are provided at their ends with journals a, supported in bearings in the standards b, secured to the base S, of the machine. By the provision of the grooved bearing rollers L, it will be readily perceived that the friction is greatly reduced.

In order to prevent frictional wear of the rollers L, and their bearings on account of the endwise pressure or thrust of the shaft K, I provide the anti-friction balls M, which rest in the bearings b, between the ends of the rollers L, and the plugs N, which are screwed into the bearings from the outside of the same as shown.

The rear or inner portion of the shaft K, is plain as better shown in Fig. 3, and is provided with a longitudinal spline groove c, which receives the spline, which connects the adjustable clutches G, G', and also serves to fix said clutches upon the shaft.

The clutches G, and G', are provided upon their inner sides with shoulders k, which are designed to engage the lugs i, and j, upon the wheels I, and J, so as to drive the shaft, as will be hereinafter described.

As better shown in Fig. 4 of the drawings a bearing block l, is loosely mounted upon the shaft K, having spindles U, formed integral therewith upon each end, with the gear wheels J', J', loosely mounted thereon between the block and the ends of the spindles, the latter resting upon the slideways P, so that while the said wheels J', J', are revolved, the spindles do not revolve, but slide upon the slideways P.

Connected to the loose disk D, on the shaft B, are rods C, which extend through the fixed disk E, and are connected at their forward ends to the gear wheel I, whereby it will be seen that they will partake of the motion of the shaft B, and will impart the same to the said gear wheel.

The clutches G, and G', are provided with cam projections H, and H', respectively, which projections are designed and adapted to engage cam projections n, and f, respectively on the fixed cross bar O, and upon the head F, of the shaft B, so that a wiping action of the cam surface is produced.

The operation of the mechanism thus far described is as follows: In order to move the shaft K, forwardly, the clutch G', engages the lug i, of the gear wheel I, which serves to fix the gear wheel I, with respect to the shaft, and moves the clutch G, away from the gear wheel J, so that the said gear wheel J, will turn loosely on the shaft. Thus when the wheel A, is rotated in the direction of the arrow the wheel I, of the shaft K, will be rotated in a corresponding direction; and the shaft, the several gear wheels and the clutches will be moved forward until the cam H, of the clutch G, engages the cam notch n, of the cross bar O, when the said clutch will be moved into engagement with the wheel J, so as to fix the said wheel, with respect to the shaft; and the clutch G, will consequently be moved out of engagement with the wheel I. When this takes place, the shaft K, will be rotated in a direction opposite to that of the wheel A, and will be moved rearwardly until the cam projection H', of the clutch G', engages the cam projections f, of the head F, upon the shaft B, (the wiping action of the cams taking place) when said clutch will be moved into engagement with the wheel I, the clutch G, will be disengaged from the wheel J, and the rearward movement of the shaft K, will begin.

In order to reduce friction between the shaft K, and the follower rod V, which forms part of a press (not shown) I provide the said rod with a head R, which has its opposite sides grooved to receive balls r, the function of which will be presently described. This head R, rests between the plate S', which is loosely mounted upon the shaft V, and the plate S², which is formed integral with or fixedly connected to the shaft K, and is connected to the plate S', by bolts T, as shown, whereby it will be seen that while the rod V, will be moved forwardly and rearwardly by the shaft K, it will not be affected by the rotation of said shaft.

Having thus described my invention, what I claim is—

1. In a machine of the character described, the combination of the rotary shaft B, the head F, the notched cross bar O, the rotary and longitudinally movable shaft K, the clutches, the gear wheels I, and J, mounted upon the shaft K, the disks D, and E, the rods C, the intermediate gears J', and the grooved rollers engaging the said shaft K, as and for the purpose set forth.

2. The screw shaft K, the clutches and gear wheels upon the shaft, the slideways P, the bearing block loosely mounted upon the said shaft and provided with spindles supported by the slideways, and the gear wheels loosely mounted upon the spindles, combined with the shaft B, the disks, the rods C, and the grooved rollers meshing in the thread of the said shaft K, as set forth.

3. The combination with the shaft K, and means for revolving and means for giving it a longitudinal movement, of the bearing block loosely mounted upon the shaft, and the spindles formed integral with the block and extending from each end of it at right-angles to the said shaft, substantially as and for the purpose set forth.

4. The combination with the shaft K, means for revolving and means for giving it a longitudinal movement, and the slideways P, of the bearing block through which the shaft passes, the spindles extending from each end of the block in the same horizontal plane with the said shaft and having their bearing upon the said slideways, substantially as and for the purpose set forth.

In testimony whereof I affix my signature in presence of two witnesses.

JOHN P. BUCKLEY.

Witnesses:
JOHN G. KOSTMAYER,
RICARDO DEE.